United States Patent Office 3,085,991
Patented Apr. 16, 1963

3,085,991
STABILIZATION OF POLYURETHANES
Anthony F. Finelli, Akron, Ohio, assignor to The Goodyear Tire & Rubber Company, Akron, Ohio, a corporation of Ohio
No Drawing. Filed Dec. 22, 1959, Ser. No. 861,171
16 Claims. (Cl. 260—45.95)

This invention relates to a process for stabilizing polyurethane elastomers within a Mooney plasticity range suitable for processing in a mill. More particularly, this invention relates to a method for preventing the uncontrolled post curing of a polyurethane elastomer.

Although polyurethane elastomers have many superior properties which contribute to their wide use, the deleterious property of post curing exhibited by polyurethane elastomers materially limits the usefulness of an aged polyurethane gum stock for some purposes since an aged elastomer may not respond to milling and forming into shaped articles, such as tires, belts, etc. Thus, the polyurethane gum stocks have to be used immediately after the formation of polyurethane by the reaction of a reactive hydrogen-containing compound with about a stoichiometric amount of an organic polyisocyanate. If this is not done the polyurethane gum stock will continue to cure even at room temperature until its Mooney plasticity values become so high that it is not responsive to milling and shaping of the rubber in a manner customarily required to build tires, belts, hose, etc. Heretofore the freshly prepared polyurethane gum stocks having Mooney plasticity values ML of 50 to 90 and Olsen flow values at 212° F. and 500 p.s.i. of 100 to 200 seconds per inch have been immediately sheeted and the sheeted material was stabilized by means of a post treatment with chemicals which destroyed the excess polyisocyanate. It is evident that these extra treating steps such as sheeting and stabilizing appreciably increase the cost of the resulting manufactured article, not to mention the inconvenience inherent in these additioal processing steps.

Accordingly, it is a principal object of this invention to provide a means for stabilizing or preventing uncontrolled post curing of the freshly prepared polyurethane gum stock without the necessity for sheeting and treating the sheeted material to effect said stabilization.

A further object of this invention is to provide a polyurethane elastomer which is stabilized within the desired Mooney plasticity range upon its removal from the heat treating zone even though the diisocyanate to reactive hydrogen polymer ratio is slightly above the ratio which normally gives no processible elastomers.

A still further object of this invention is to provide additives for stabilizing polyurethane gum stocks within a Mooney plasticity range suitable for milling and other processing.

Another object of this invention is to provide a process for preparing polyurethane gum stock wherein the critical ratio between the reactive hydrogen-containing compound and the polyisocyanate may be materially increased to provide certain flexibilities in compounding or preparing polyurethane gum stock.

Other objects of this invention will be apparent from the following discussion of the critical aspects of this invention.

The objects of this invention may be achieved by forming polyurethane elastomers by reacting a reactive hydrogen-containing compound in the presence of a stabilizing agent with substantially a stoichiometric amount of polyisocyanate and then heat treating to cure said reaction product to obtain the desired Mooney plasticity values required to permit the gum stock to be milled and otherwise processed. To obtain the desired stabilization the reactive hydrogen containing compound and organic polyisocyanate should be reacted in the presence of at least about 0.1 and preferably no more than 1.5 parts of a substituted phenol having an ionization constant within the range specified hereinafter. Throughout this specification the parts of stabilizer used is based on 100 parts of reactive hydrogen containing compound present in the reactive product. In general about 1.5 parts of substituted phenol will be the upper limit desired although the stabilization treatment may be as high as three parts per hundred or higher providing the odor of the phenol and the slower rate of cure may be tolerated. The substituted phenols usable in this invention have ionization constants of at least $1 \times 10^{-10}$ and no greater than $1 \times 10^{-5}$ with the preferred range being less than about $1 \times 10^{-7}$. The substituted phenols preferred in this invention are the monosubstituted phenols which may be grouped into the classes consisting of monoalkyl ethers of dihydroxy benzene, alkyl or alkylated phenols, chloro or chlorinated phenols and the nitro phenols. Some specific compounds belonging to the above class of substituted phenols useful in this invention are: the monomethyl ether of hydroquinone, monoethyl ether of hydroquinone, monobutyl ether of hydroquinone, paratertiary butyl phenol, amyl phenol, ethyl phenol, parachloro phenol, orthochloro phenol, paranitro phenol and orthonitro phenol.

In general the reactive hydrogen-containing compound is preferably reacted with a slight excess of an organic polyisocyanate to give the desired polyurethane elastomer, although millable gum stocks are obtained at an organo diisocyanate to reactive hydrogen-containing compound ratio of about 0.98 to 1.03. If the ratio of reactive hydrogen-containing compound to polyisocyanate exceeds these limits the resulting elastomer may be too soft or too hard to be successfully processed in conventional rubber processing equipment even when first made and baked. Applicant has discovered that if about 0.1 to about 1.5 parts of a monosubstituted phenol having an ionization constant of at least $1 \times 10^{-10}$ and no greater than $1 \times 10^{-5}$ is added to the reaction mixture or to one of the reactants prior to the formation of the polyurethane, the need to control the ratio of reactive hydrogen-containing compound to polyisocyanate within these limits is not nearly so critical. For example, the presence of a phenol of the desired ionization value will frequently permit the desired Mooney plasticity values to be obtained in raw gum stock even though the ratio of diisocyanate to reactive hydrogen-containing compound may vary as much as about 0.01 to 0.03 from the ratio that normally gives millable and bandable freshly made and baked gum stocks. On the other hand, if this same ratio is used to prepare the raw gum stock in the absence of the phenol, the resulting polyurethane gum stock will frequently be non-processible and substantially an intractable rubber. The scope of variation permissible when using a phenol is to a certain extent a function of the molecular weight of the reactive hydrogen-containing compound. Thus a polyester of about 1800 molecular weight will require from about 0.25 to 1.0 part of phenol per 100 parts of polyester to obtain a polyurethane gum stock having Mooney plasticity values ML of from 50 to 90 and Olsen flow values of about 100 to 200 when the ratio of organo diisocyanate to polyester is between 0.98 to 1.03. On the other hand, other molecular weight materials may require more or less phenol to stabilize the product within the above plasticity and Olsen flow ranges.

Once the reactive hydrogen-containing compound has reacted with the polyisocyanate to give a viscous but pourable reaction product, it is heated in an oven at temperatures of about 100 to 110° C. until the elastomer develops the desired Mooney plasticity and Olsen flow values. Then the heat treatment is stopped and the polyurethane elastomer which contains the phenolic stabilizers of this invention may be stored until it is needed without exhibiting an appreciable increase in either the Mooney plasticity or the Olsen flow. Hence the use of phenols having the desired ionization constant prevents post curing of the polyurethane elastomer and eliminates the need to sheet the polyurethane elastomer and the need to subject the sheeted material to a stabilization treatment in accordance with the preferred practices utilized heretofore.

The reactive hydrogen-containing compound may be a polyfunctional compound selected from the class consisting of the polyester glycols, polyether glycols, polyesteramides, etc. having a molecular weight of about 700 to 6000. The polyesters useful in this invention may be prepared by reacting an excess of a polyol with a polycarboxylic acid to give an esterification product which has a carboxyl number preferably less than about 5 and a hydroxyl number of from 20 to about 150 milligrams of KOH per gram of polyester. Examples of suitable glycols for use in preparing polyester glycols are ethylene glycol, propylene glycol, tetramethylene glycol and hexylene glycol. Examples of suitable dicarboxylic acids for use in the preparation of polyester glycols are succinic, adipic, malonic, suberic, phthalic, terephthalic, isophthalic, sebacic and isosebacic acid. In general, the polyesters useful in this invention should have a molecular weight of about 700 to 5000 with the preferred molecular weight being 1000 to 2500.

Examples of suitable polyether glycols useful in this invention are polyethylene ether glycol, polypropylene ether glycol, polytetramethylene ether glycol and mixtures of these glycols. The preferred range of molecular weight of these polyether glycols is from about 1000 to 2500 but those polyether glycols having a molecular weight of about 700 to 5000 may be used too.

Although it is known that any polyisocyanate may be employed to yield polyurethane elastomers, it is also realized that where the polyisocyanate is trifunctional the resulting polyurethane elastomer tends to be boardy and almost unresponsive to milling and processing in a manner conventionally associated with the fabrication of rubbery products. Thus although the substituted phenols of this invention will have a beneficial effect on polyurethane elastomers prepared using trifunctional polyisocyanates it should not be expected that they would be able to overcome the greater crosslinking ability inherent in the use of trifunctional polyisocyanates. Consequently the preferred embodiment of this invention relates to the use of substituted phenols with organo diisocyanates. Illustrated examples of said diisocyanates are trimethylene diisocyanate, tetramethylene diisocyanate, pentamethylene diisocyanate, hexamethylene diisocyanate, decamethylene diisocyanate, cyclopentylene 1,3-diisocyanate, 1,4-diisocyanato cyclohexane, p-phenylene diisocyanate, m-phenylene diisocyanate, tolylene diisocyanates, naphthalene diisocyanates, 4,4'-diphenyl propane diisocyanate, 4,4'-diphenylmethane diisocyanate, tolidine diisocyanate, diphenyl sulfone, 4,4'-diisocyanate, etc.

It should be apparent to those skilled in the art that various additives, accelerators, compounding ingredients, reinforcing agents, pigments, etc. may be compounded with the polyurethane elastomers of this invention without departing from the scope thereof.

To specifically illustrate a preferred embodiment of this invention with a polyether glycol, a polyether glycol having a molecular weight of between 1800 and 4000 was reacted with 1.01 ratios of tolidine diisocyanate. Prior to the reaction of the polyether glycol with the diisocyanate, 0.5 to 1.0 part of a substituted phenol was incorporated therein. This formulation without the phenol gives a product having a potential Olsen flow value of 522, but when the oven baked product contains the phenolic stabilizer in the above amounts, it has an Olsen flow of less than about 200 and is readily millable and processible even after storage for several months. Thus, this gum stock could be accumulated and stored until needed for processing into tires, belts and hose, for example. Similar stabilization results were obtained when the polyesters were used instead of the polyether as will be shown in greater detail in the following examples which according to the process of this invention are submitted solely for the purpose of illustration and are not to be construed as limiting the invention in any way. In these examples, all parts are by weight unless otherwise designated.

EXAMPLE 1

500 parts of a polyester was placed in a two liter resin reaction kettle equipped with a stirrer and thermometer. This polyester was formed by reacting a mixture consisting of 85 parts of ethylene glycol and 15 parts of glycerol allyl ether with adipic acid to obtain an esterified product having a reactive number of 56.9 milligrams of KOH per gram of polyester. The temperature of the kettle was raised to about 65° C. and then 1.25 parts of phenylbetanaphthylamine and 0.6 part hydroquinone monomethyl ether was added. Tolidine diisocyanate (67.5 parts) was added to the contents of the kettle at 70° C. After the mixture had reacted for 12 minutes, the reaction product was discharged into a tray and covered with an aluminum plate. The covered tray was placed in an oven at 100° C. for 12 hours after which the tray was removed and the rubber stored at room temperature. At periodic intervals, samples were taken from the stored product and subjected to the Olsen flow test, said test being run at 212° F. and 500 lbs. per sq. in. pressure. The results of this test are expressed in number of seconds required to produce one inch of flow in Table I.

*Table 1*

| Aged, days | 0 | 7 | 21 | 30 |
|---|---|---|---|---|
| Olsen flow sec./1 in | 117 | 120 | 117 | 113 |

The above examples were repeated except the sample was allowed to remain in the 100° oven for 21 hours to develop its potential or maximum plasticity value. The potential or maximum plasticity values obtained on this sample were no higher than about 200 Olsen flow. On the other hand after the same formulation was used without the use of a substituted phenol as a stabilization additive, the polyurethane elastomer had an Olsen flow value of 462 seconds after only 9 hours in the 100° C. oven, and was essentially non-processible on conventional rubber milling equipment.

If instead of 0.6 part of hydroquinone monomethyl ether 1.8 parts thereof were used in the above formulation, the resulting polyurethane elastomer had an Olsen flow of 120 after only 7½ hours in the 100° C. oven, and after 28 days at room temperature, the Olsen flow values had increased only to 128. Thus, these stabilization treatments are able not only to maintain or hold polyurethane elastomers having a potential Olsen flow value between 300 and 400 seconds within the more desirable mill processing range, but it is also able to reduce the potential Olsen flow of the rubber.

EXAMPLE 2

A polyurethane rubber stabilized with a paratertiary butyl phenol was made by the following recipe:

750 parts of adipate ester having a reactive number of 62.5
1 part of phenylbetanaphthylamine
7.5 parts paratertiary butyl phenol
109 parts tolidine diisocyanate This polyurethane was oven cured at 100° C. for 11 hours. Then it was removed from the oven and an Olsen flow test was run immediately on this product. The product had an Olsen flow of 154 seconds per inch. After storage for 124 days this elastomer had an Olsen flow of 120. If the paratertiary butyl phenol was omitted from the above recipe, the resulting elastomer had an Olsen flow in excess of 400 seconds per inch when removed from the curing oven. Even though the Olsen flow test is only a qualitative tool and not a quantitative one, it serves to indicate the relative processibility of an elastomer. Thus, it should be readily apparent that the use of paratertiary butyl phenol was able to maintain polyurethane elastomers within the upper limit of processibility with about 200 seconds Olsen flow being considered about the upper limit for ready processibility.

EXAMPLE 3

The formulation of Example 2 was repeated without the use of a substituted phenol and the amount of tolidine diisocyanate was reduced from 109 parts to 106.7 parts. This elastomer had an Olsen flow of 129 seconds after 18 hours in the 100° C. oven. Upon aging at room temperature this sample showed an appreciable increase in Olsen flow and soon became too tough to be readily processible. A comparison of Example 2 with Example 3 readily demonstrates the ability of a substituted phenol to inhibit post curing even where the polyurethane elastomer contains a relatively large excess of diisocyanate.

EXAMPLE 4

To demonstrate the ability of para nitrophenol to stabilize polyurethane elastomers two batches of polyurethane elastomers were made, one with and one without para nitrophenol using the formulation below:

300 parts of a polyester [1]
0.5 part of phenylbetanaphthylamine
43.1 parts tolidine diisocyanate

[1] This polyester consists of the reaction product of adipic acid and a mixture of diols consisting of 85 parts of ethylene glycol and 15 parts of glycerol allyl ether.

The sample without para nitrophenol had an Olsen flow of 245 after only 2½ hours in the 100° C. oven and had an Olsen flow of 544 sec. after 20 hours in said oven, but the second batch which contained two parts of para nitrophenol had an Olsen flow of 176 sec. after 5¼ hours in the 100° C. oven, and the Olsen flow was only 171 sec. after aging for 69 days.

EXAMPLES 5–11

To further demonstrate the ability of the mono substituted phenols to maintain a polyurethane elastomer having a potential Olsen flow in excess of 750 within processible limits, several batches of elastomers were made using the elastomer recipe shown in Table II wherein all parts are by weight.

In Example 5 it will be noted that this elastomer had an Olsen flow of 750 and after curing at room temperature for 24 days, the Olsen flow had increased to about 3000. It should also be noted in Example 6 that when the polyester to diisocyanate ratio was increased by using 1.3 more parts of tolidine diisocyanate, the resulting elastomer had an Olsen flow of 1330 but when the same amount of tolidine diisocyanate to polyester ratio was used in Examples 7 and 8, as in Example 5, the resulting elastomer had an Olsen flow well within the millable and processible range. Thus, it is readily apparent that paratertiary butyl phenol was able to keep a polyurethane elastomer having a potential Olsen flow of at least 750 within processible and millable ranges even though the elastomer of Example 8 was oven baked at 100° C. for 24 hours. Similarly, para nitrophenol was able to maintain the elastomer of Examples 9 and 10 within processible and millable limits. A comparison of Example 11 with Example 6 shows that para nitrophenol is able to maintain a polyurethane elastomer having a potential Olsen flow of 1330 within millable and processible limits.

Thus by using the substituted phenols in the conventional recipes for producing polyurethane elastomers, it is possible to obtain elastomers which have Olsen flows within the range acceptable for good mill processing and furthermore the resulting elastomers are relatively resistant to post curing. Thus, this method of producing polyurethane elastomers decreases the overall cost of stabilization and eliminates the extra processing steps required heretofore in the production of polyurethane elastomers for use in building tires and related articles, and also allows for processing of the polyurethane elastomers to proceed immediately after the polyurethane elastomers come from the curing oven without the need to mill or Banbury to achieve stabilization.

Table II

| Example No. | 5 | 6 | 7 | 8 | 9 | 10 | 11 |
|---|---|---|---|---|---|---|---|
| Polyester | 300 | 300 | 300 | 300 | 300 | 300 | 300 |
| Tolidine diisocyanate | 42.2 | 43.5 | 42.2 | 42.2 | 42.8 | 42.8 | 43.5 |
| Paratertiary butylphenol | | | 1.5 | 1.5 | | | |
| Para nitrophenol | | | | | 1.5 | 1.5 | 3.0 |
| Hours, oven baked | 17 | 6 | 8.5 | 24 | 8 | 19 | 4½ |
| Olsen flow | 750 | 1,330 | 145 | 138 | 122 | 109 | 120 |

EXAMPLE 12

Tetramethylene ether glycol, reactive number 36.9, and 1½ parts of paratertiary butyl phenol was placed into two liter reaction kettle equipped with stirrer. The temperature of 300 parts of polytetramethylene ether glycol was raised to 103° C. and 26.7 parts tolidine diisocyanate was added. This was stirred and allowed to react for 18 minutes at 100° C. Then the fluid reaction product was poured into a tray and placed in a 100° C. oven for 41 hours. Then the tray was removed from the oven and a sample of rubber taken from the tray for Olsen flow tests. This sample had an Olsen flow of 111. An experiment using the above recipe except that no paratertiary butyl phenol was added developed an Olsen flow of 522 after only 40 hours in the oven. When parachloro phenol was substituted for paratertiary butyl phenol in the above recipe similar stabilization of the polyurethane elastomer was obtained.

While certain representative embodiments and details have been shown for the purpose of illustrating the invention, it will be apparent to those skilled in this art that various changes and modifications may be made therein without departing from the spirit or scope of the invention.

What is claimed is:

1. In a process for preparing millable polyurethane elastomers (1) by forming a reaction mixture of a reactive hydrogen containing compound of about 700 to 6000 molecular weight selected from the class consisting of polyester glycols and polyether glycols, with essentially an equivalent molar amount of an organic diisocyanate and then reacting and curing said mixture per se to obtain a millable elastomer, the improvement comprising adding to said reaction mixture on a 100 parts of reactive hydrogen containing compound basis at least 0.1 to 3 parts of a substituted phenol having an ionization constant of at least $1 \times 10^{-10}$ and no greater than $1 \times 10^{-5}$ before the reaction mixture is reacted and cured to stabilize the cured elastomer in the millable state for an extended time.

2. The process of claim 1 wherein the substituted phenol is present in an amount equal to at least 0.1 and up to about 1.5 parts per 100 parts by weight of reactive hydrogen-containing compound.

3. The process of claim 2 wherein the reactive hydrogen-containing compound is a polyether glycol.

4. The process of claim 2 wherein the reactive hydrogen-containing compound is a polyester.

5. The process of claim 2 wherein the substituted phenol is a para monoalkyl phenol.

6. The process of claim 2 wherein the substituted phenol is a monoalkyl ether of dihydroxylated benzene.

7. In a process for preparing millable polyurethane elastomers (1) by forming a reaction mixture of a reactive hydrogen containing compound of about 700 to 6000 molecular weight selected from the class consisting of polyester glycols and polyether glycols, with essentially an equivalent molar amount of an organic diisocyanate and then reacting and curing said mixture per se to obtain a millable elastomer, the improvement comprising adding to said reaction mixture on a 100 parts of reactive hydrogen containing compound basis at least 0.1 to 3 parts of a substituted phenol having an ionization constant of at least $1 \times 10^{-10}$ and no greater than $1 \times 10^{-7}$ before the reaction mixture is reacted and cured to stabilize the cured elastomer in the millable state for an extended time.

8. The process of claim 7 wherein the substituted phenol is present in an amount equal to at least 0.1 and up to about 1.5 parts per 100 parts by weight of reactive hydrogen-containing compound.

9. The process of claim 7 wherein the reactive hydrogen containing compound is a polyether glycol.

10. The process of claim 7 wherein the reactive hydrogen containing compound is a polyester.

11. The process of claim 7 wherein the substituted phenol is a monoalkyl phenol.

12. The process of claim 7 wherein the substituted phenol is a monoalkyl ether of dihydroxylated benzene.

13. In a process for preparing millable polyurethane elastomers by forming (1) a reaction mixture of a reactive hydrogen containing compound of about 700 to 6000 molecular weight selected from the class consisting of polyester glycols and polyether glycols with an organic diisocyanate, the molar ratio of diisocyanate to reactive hydrogen containing compound being 0.98 to 1.03 and (2) then reacting and curing said mixture per se to obtain a millable elastomer having a Mooney plasticity value ML of from 50 to 90, the improvement comprising adding to said reaction mixture on 100 parts of reactive hydrogen containing compound basis at least 0.1 to 3 parts of a substituted phenol having an ionization constant of at least $1 \times 10^{-10}$ and no greater than $1 \times 10^{-5}$ before the reaction mixture is reacted and cured to stabilize the cured elastomer in the millable state for an extended time.

14. In the process of claim 13, the improvement where the substituted phenol is hydroquinonemonomethyl ether.

15. In the process of claim 13, the improvement where the substituted phenol is para-tertiarybutylphenol.

16. In the process of claim 13, the improvement where the substituted phenol is selected from the class consisting of a chlorophenol and a nitrophenol.

References Cited in the file of this patent

UNITED STATES PATENTS

| | | |
|---|---|---|
| 2,830,038 | Pattison | Apr. 8, 1958 |
| 2,915,496 | Swart et al. | Dec. 1, 1959 |
| 2,917,486 | Nelson et al. | Dec. 15, 1959 |